US008117999B2

(12) United States Patent
Cerny et al.

(10) Patent No.: US 8,117,999 B2
(45) Date of Patent: Feb. 21, 2012

(54) ELECTROLYTE DELIVERY SYSTEM AND METHOD

(75) Inventors: Zdenek Cerny, Brampton (CA); Francis Michael Burke, Toronto (CA)

(73) Assignee: Martinrea International Inc., Ontario (CA)

( * ) Notice: Subject to any disclaimer, the term of this patent is extended or adjusted under 35 U.S.C. 154(b) by 453 days.

(21) Appl. No.: 12/281,836

(22) PCT Filed: Mar. 6, 2007

(86) PCT No.: PCT/CA2007/000364
§ 371 (c)(1),
(2), (4) Date: Jan. 28, 2009

(87) PCT Pub. No.: WO2007/101342
PCT Pub. Date: Sep. 13, 2007

(65) Prior Publication Data
US 2009/0139469 A1 Jun. 4, 2009

(30) Foreign Application Priority Data

Mar. 8, 2006 (CA) .................................... 2538935
Feb. 1, 2007 (CA) .................................... 2576682

(51) Int. Cl.
*F02B 43/08* (2006.01)

(52) U.S. Cl. ..................................... 123/3; 123/DIG. 12
(58) Field of Classification Search .......... 123/536–538, 123/575–578, 3, 1 A
See application file for complete search history.

(56) References Cited

U.S. PATENT DOCUMENTS

| 5,884,475 A * | 3/1999 | Hofmann et al. ............... 60/274 |
| 2003/0024489 A1* | 2/2003 | Balan et al. ........................ 123/3 |
| 2003/0049504 A1* | 3/2003 | Wheat et al. .................... 429/24 |
| 2003/0141200 A1* | 7/2003 | Harada .......................... 205/637 |
| 2004/0040838 A1 | 3/2004 | Helmke et al. |

FOREIGN PATENT DOCUMENTS

| CA | 2368508 A1 | 7/2002 |
| WO | 2005047568 A1 | 5/2005 |

* cited by examiner

*Primary Examiner* — Michael Cuff
*Assistant Examiner* — Hung Q Nguyen
(74) *Attorney, Agent, or Firm* — The Webb Law Firm

(57) ABSTRACT

In a system for providing electrolyte to an electrolysis cell for producing hydrogen gas to inject into the intake of an internal combustion engine, a water store is in communication with a water supply line, for replenishing the level of electrolyte solution used by the electrolysis cell. A valve which may be disposed at a level below the level of the water supply line and is opened, for example upon deactivation of the engine, to drain the water out of the water supply line and prevent freezing in sub-freezing temperatures.

19 Claims, 2 Drawing Sheets

ELECTROLYTE DELIVERY SYSTEM AND METHOD

FIELD OF THE INVENTION

This invention relates to systems for improving the fuel efficiency of internal combustion engines. In particular, this invention relates to electrolyte delivery systems for use with internal combustion engines.

BACKGROUND OF THE INVENTION

Improving the fuel efficiency of internal combustion engines has been of interest for many years. Gasoline is a standard fuel for internal combustion engines, but many of the bi-products of incomplete gasoline combustion are harmful to the environment. This has given rise to much concern over the long term effects of the prolific use of internal combustion engines. Many approaches have been taken to reducing these harmful emissions, some more successful than others, but further measures are necessary in order to meet increasingly strict emission standards. Also gasoline is a non-renewable resource, and given worldwide trends in the supply and demand of gasoline, the upward pressure on the price of gasoline and other petroleum products will undoubtedly continue. As the cost of fuels such as gasoline continues to rise, it becomes ever more desirable to increase the fuel efficiency of internal combustion engines to limit increases in fuel-related costs in areas such as transportation, power generation, construction, mining and forestry.

Recently it has been estimated that enhancing combustion with a small stream of hydrogen gas may result in a potential improvement in fuel economy of 20 percent or more, depending on the engine, due to increased combustion efficiency. The expected improvement in internal combustion engine combustion efficiency is achieved by adding hydrogen into the air-fuel mixture. The effect of hydrogen and its unique diffusion properties is believed to increase the speed of laminar flame in the air-fuel mixture at the initiation phase of the combustion cycle. The high rate of flame growth reduces the overall combustion cycle time resulting in more complete combustion, reduced fuel consumption and reduced emissions.

Hydrogen gas may be produced by employing an electrolyzer, which uses electrical current to produce hydrogen gas from water (or an electrolyte solution), powered by an alternator or generator running off the internal combustion engine. However, there are many obstacles to employing an electrolyzer in every day use, especially in transportation applications such as motor vehicles, including automobiles.

The pressure of hydrogen gas must be controlled to prevent explosion, and the hydrogen gas must be delivered to the engine in a controlled stream in order to maximize its efficient usage while not interfering with the combustion of the gasoline. There are other products resulting from the electrolysis process, oxygen gas and electrolyte (if used), which must be kept separate from the hydrogen stream. Pure oxygen is highly explosive, and must be safely discharged either into the atmosphere, or directly into the engine for combustion. The electrolyte can be harmful to the environment, and must either be reused or discarded in an environmentally friendly manner.

In the automotive application, the environmental conditions also present significant difficulties. In cold climates the water used to produce the hydrogen gas will freeze at temperatures below 0 degrees Celsius. While an electrolyte such as potassium hydroxide (which has a lower freezing temperature) may be used in the electrolysis cell itself, it is advantageous to provide a store of distilled water on board the vehicle to replenish the electrolyte solution as it is depleted. Although an electrolyte solution such as potassium hydroxide is unlikely to freeze because of its lower freezing temperature, water freezes at temperatures that are quite commonly encountered in winter months in many regions. This can cause supply lines to crack.

Thus, it would be advantageous to provide a system for preventing freezing of any line supplying water for (or as) the electrolyte solution in and electrolyte delivery system.

BRIEF DESCRIPTION OF THE DRAWINGS

In drawings which illustrate by way of example only a preferred embodiment of the invention.

DETAILED DESCRIPTION OF THE INVENTION

Figure 1:
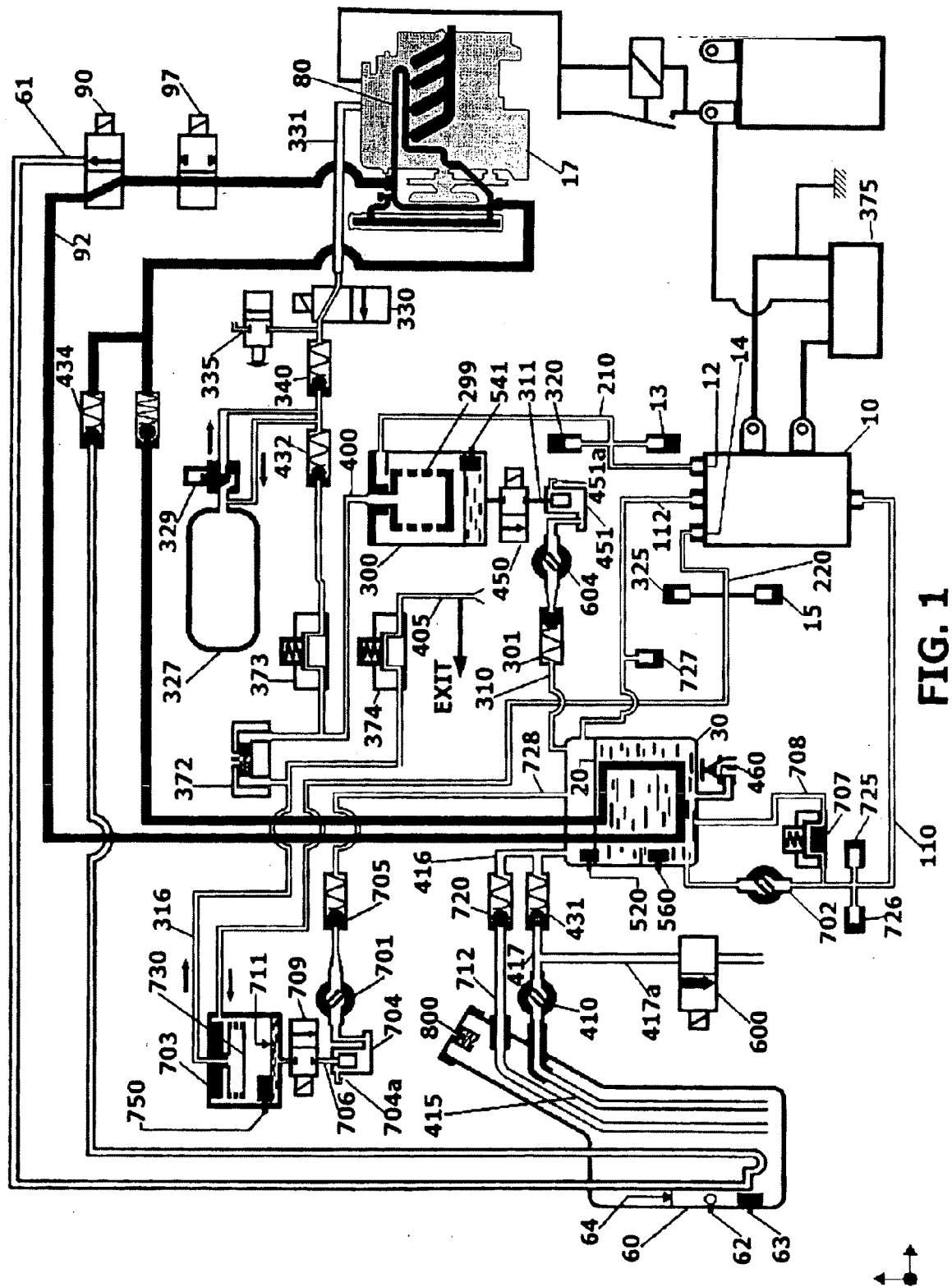
FIG. 1 is a schematic view of a first embodiment of the hydrogen delivery system.

In one aspect the invention provides a system for circulating an electrolyte solution between a reservoir and an electrolysis cell, the system comprising: a water store in communication with a water supply line, for replenishing a level of electrolyte solution used by the electrolysis cell, and a valve disposed in fluid communication with the supply line, whereby when the valve is opened the water drains out of the water supply line.

In a further aspect the invention provides a method of preventing freezing of a water supply line for replenishing a level of electrolyte solution used by an electrolysis cell in a motor vehicle having a combustion engine, comprising the steps of: a. sensing deactivation of the engine, and b. subsequent to deactivation of the engine, opening a valve disposed in fluid communication with the supply line, whereby when the valve is opened water drains out of the water supply line.

An advantage of this electrolyte delivery system is that the system can accommodate an on-board water supply for replenishing the supply of electrolyte solution, regardless of the climactic conditions in which the system will be used. The present invention can thus be advantageously used in an on-board hydrogen generating system in a motor vehicle.

The electrolyte delivery system of the present invention delivers electrolyte to an electrolysis cell in a wide range of environmental conditions. In the preferred embodiment shown in FIG. 1, an electrolyzer is used to produce hydrogen gas ($H_2$) from an electrolyte. The electrolyzer may be an electrolysis cell 10 comprising a plurality of anodes and cathodes or a single anode-cathode pair. Alternatively, two or more electrolysis cells could be used in combination as an electrolysis unit with the delivery system of the present invention, in order to produce a greater flow of hydrogen gas.

The present invention is primarily discussed in this specification in the context of an automotive application. While the invention is not limited for use in such an application in that the principles of the invention set out in detail below apply to any internal combustion engine, many of the advantages associated with the invention overcome difficulties inherent in an automotive application. These difficulties include: a restriction on space available, portability, extremes in temperature variation (−40° C. to +50° C.), safety, inaccessibility and the desirability of "instant-on" operation. The system of the invention is particularly useful for reducing harmful emissions from a gasoline combustion engine, including start-up emissions since most of the harmful emissions produced by an automobile engine are discharged within a very short time following a cold start of the engine.

A suitable electrolysis cell 10, by way of example only, is described and illustrated in U.S. Patent Application 20040040838 ELECTROLYZER filed on Apr. 18, 2003, naming Helmke, Joachim; Kohnke, Hans-Joachim; and, Balan, Gabi as inventors, which is incorporated herein by reference. The electrolysis cell so described provides the advantage of separating the hydrogen and oxygen gases within the electrolysis cell 10 itself, which obviates the need to provide additional gas separation means downstream of the output from the electrolysis cell 10 in order to ensure that hydrogen is isolated for delivery to the engine. It will be appreciated, however, that other types of electrolysis cells can be beneficially used in conjunction with the electrolyte delivery system of the present invention, thus the invention is not intended to be limited thereby.

Electrolyte is circulated between the anode-cathode pairs to generate hydrogen gas and oxygen gas ($O_2$) through the electrolysis process, as is well known in the art. In the preferred embodiment, the electrolyte comprises an electrolyte solution 20, the solution comprising de-ionized water and electrolyte such as potassium hydroxide (KOH), for example in a concentration of about 15 to 30% although concentrations outside this range may be possible. While it is advantageous to employ an electrolyte solution, it is also possible to use distilled water as the electrolyte for generating hydrogen and oxygen gas, although electrolysis will take place with a lower efficiency and there is a risk of the electrolyte freezing in low temperature applications.

In an embodiment of the present invention, engine coolant is diverted from the coolant circuit to transfer heat to the electrolyte delivery system. Thus, one embodiment of the present invention provides the opportunity to use water as an electrolyte even in extreme environmental conditions, because it reduces the consequences of the water freezing in the cell. However, while it is possible to construct a cell that can accommodate frozen electrolysis liquid (water or electrolyte solution) without causing damage, there are inherent practical difficulties. If the liquid is frozen, electrolysis will not take place and the cell will be unable to produce hydrogen. Thus, permitting the liquid to freeze delays the supply of hydrogen until the electrolyte can be thawed. In an automotive application, short trips in winter may be completed before the liquid can be fully thawed. While the present invention provides a means for alleviating this problem by heating the electrolyte solution using heat transferred from the engine coolant, unless the cell is also heated while the car engine is turned off and no coolant is circulated, the use of an electrolyte solution such as KOH with a lower freezing point than water remains preferred.

Figure 2:
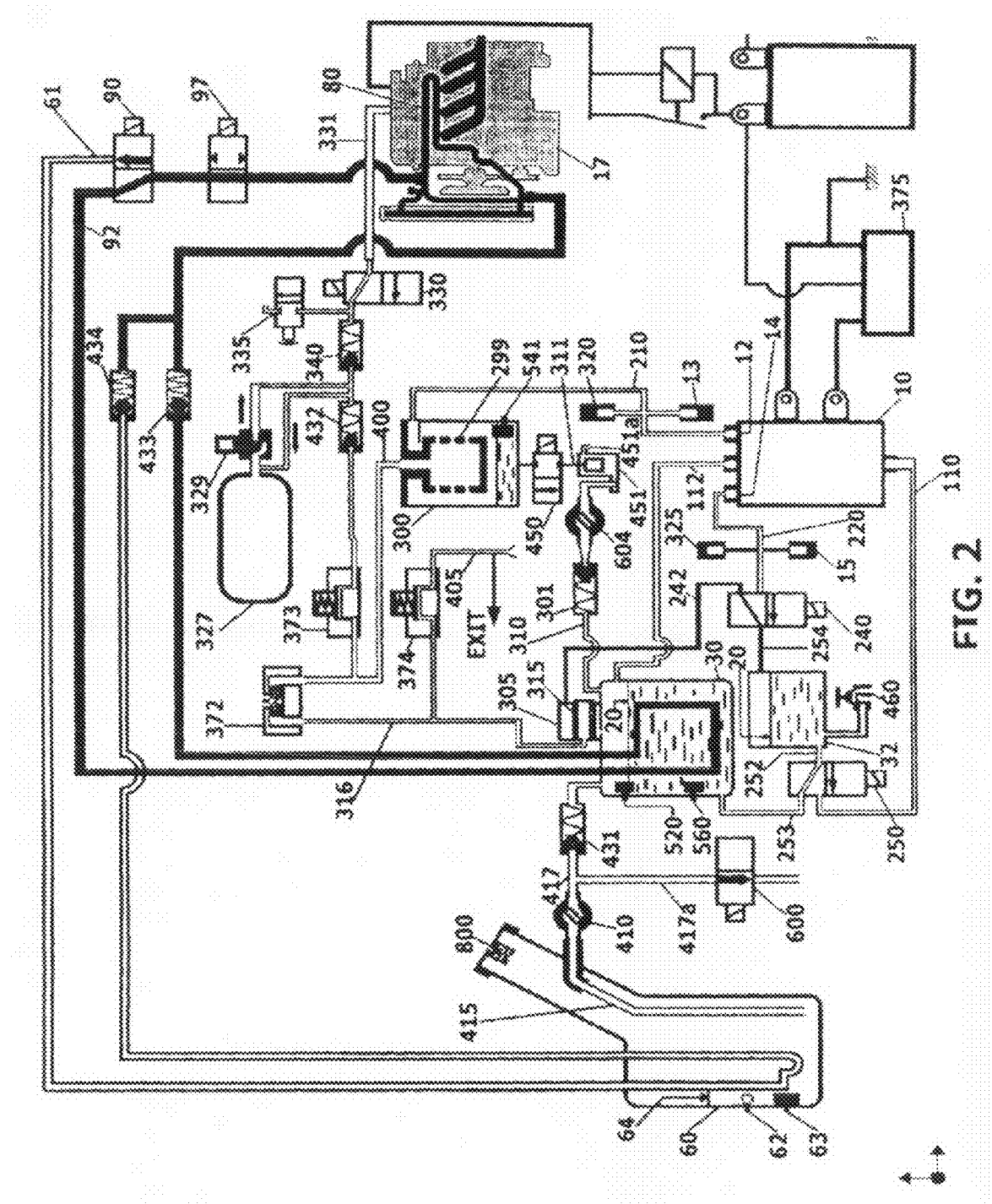
FIG. 2 is a schematic view of a further embodiment of the hydrogen delivery system that pumps electrolyte using the pressure of a working gas.

In the embodiment illustrated in FIG. 2 electrolyte is circulated intermittently by a working gas, in the embodiment shown oxygen. Two reservoirs, a storage reservoir 30 and a supply reservoir 32, are used for storage and supply of the electrolyte solution 20. Although shown as separate units in FIG. 1, which may be advantageous in certain applications because of the limited room available for extra equipment in a typical automobile, the storage reservoir 30 and supply reservoir 32 may be combined as a single unit as may be convenient for locating them within the available space. Preferably the supply reservoir 32 is disposed below the storage reservoir 30 so that electrolyte flows from storage reservoir 30 to supply reservoir 32 by means of gravity. If another arrangement is desired, such as locating the reservoirs remotely or in an alternate configuration due to space requirements, a suitable pump (not shown), for example a diaphragm pump resistant to any corrosive effects of the electrolyte (e.g. having an EPDM diaphragm), can be introduced to move electrolyte solution 20 from the storage reservoir 30 to the supply reservoir 32. This may eliminate the need for multiple electrolyte reservoirs.

The system of the invention further comprises a container 60 for supplying distilled water to maintain the required electrolyte level. Fluid communication between components of the system may be effected by connecting suitable tubing, corrosion-resistant where necessary.

During operation of the embodiment of FIG. 2, electrolyte solution 20 flows from the supply reservoir 32 through supply line 252 into the electrolysis cell 10 via electrolyte intake line 110, and electrolysis reactions occur between the anodes and cathodes within the electrolysis cell. This produces oxygen and hydrogen gases, and in the case of the electrolyzer described and illustrated in U.S. Patent Publication No. 20040040838, the hydrogen and oxygen gases are separated within the electrolysis cell 10 and output through hydrogen and oxygen ports 12 and 14, respectively. Pressure relief valves 13 and 15 permit safe exhaust of the hydrogen and oxygen lines, limiting the pressure of the gases to avoid an over-pressure condition.

The hydrogen gas is forced by the natural pressure generated during the electrolysis process, through hydrogen supply line 210 to a separator comprising separation chamber 300. The separator is advantageous because when the hydrogen gas is produced in the electrolysis cell 10, electrolyte solution 20 becomes entrained in the gas and is carried from the electrolysis cell 10. In the case of an electrolyte solution such as KOH, the electrolyte solution is highly corrosive and an environmental hazard. In this case, it is not desirable to expose the engine to a corrosive solution and potentially harmful to the environment to inject KOH into the engine.

In a preferred embodiment, hydrogen moisture separation chamber 300 comprises a gas/liquid separator such as a knock-out drum or centrifugal separator. In a knock-out drum, the electrolyte droplets are removed from the hydrogen gas flow by providing an abrupt increase in the cross-sectional area of the hydrogen flow path. The increase leads to a sudden decrease in the velocity of the hydrogen gas such that the entrained electrolyte droplets can no longer remain entrained in the flow of gas and settle to the bottom of the chamber 300 under the influence of gravity. A conventional pleated cartridge or filter element may be employed for this purpose. Any suitable alternative separator may be employed, for example an impingement separator in which a target, such as a mesh or vane, is placed in the flow path to intercept the entrained electrolyte.

The separated electrolyte 22 accumulated at the bottom of chamber 300 is forced out by the hydrogen pressure through a valve 450, which is actuated by level sensor 541 within the separation chamber 300 to momentarily open (for example for ½ second) to deliver separated electrolyte 22 to buffer chamber 451. Pump 604 removes the separated electrolyte 22 from the bottom of buffer chamber 451 and forces the electrolyte 22 though one-way valve 301 into the storage reservoir 30, thus recycling the separated electrolyte 22 and allowing a small volume of hydrogen to vent through an orifice 451*a* at the top of buffer chamber 451. Pump 604 is momentarily activated (for example for ½ second) after a short time delay (e.g. two seconds) following the closing of valve 450, to avoid excessive hydrogen loss. The buffer chamber 451 may be designed with a conical walls and a spherical bottom surface to permit ice skidding, thus preventing any structural damage to the chamber in the event that the remaining portion of the separated liquid freezes and expands inside the chamber.

It is also possible to circulate the electrolyte solution continuously, as in the embodiment of FIG. 1 in which a pump 702 provides electrolyte circulation instead of using a supply reservoir 32 with the intermittent valve arrangement of FIG. 2. In the embodiment of FIG. 1 oxygen gas flows from the cell 10 through line 220 to a separator comprising moisture separation chamber 703, which is configured much like moisture separation chamber 300. In this case the separated electrolyte 711 accumulated at the bottom of chamber 703 is forced out by the oxygen pressure through a valve 709, which is actuated by level sensor 750 within the separation chamber 703 to momentarily open (for example for ½ second) to deliver separated electrolyte 711 to buffer chamber 704. Pump 701 removes the separated electrolyte 711 from the bottom of buffer chamber 704 and forces the electrolyte 711 though one-way valve 705 into the storage reservoir 30, thus recycling the separated electrolyte 711 and allowing a small volume of oxygen to vent through an orifice 704a at the top of buffer chamber 704. If the oxygen is to be used for any other purpose, pump 701 can be momentarily activated (for example for ½ second) after a short time delay (e.g. two seconds) following the closing of valve 709, to avoid excessive oxygen loss, In this embodiment pump 702 delivers electrolyte solution from the storage reservoir 30 through line 110 to cell 10. Preferably pressure sensor 725 is installed on line 110, providing feedback to a controller such as an electronic control module (ECM) 375, line 110 is equipped with a pressure relief valve 726 while electrolyte return line 112 is equipped with a pressure relief valve 727, to ensure that the electrolyte circulating system remains within operating pressures. Preferably also a by-pass return circuit is positioned between pump 702 and pressure sensor 725 which includes an electrolyte solution pressure regulator 707 with return line 708 connected to reservoir 30, serving as a pressure and volume compensating circuit for balancing the delivery of electrolyte solution to the cell 10.

Thus, in the embodiment of FIG. 1 the electrolyte circulation is continuous. Water consumption in the electrolysis cell and the consequent progressive reduction of electrolyte volume in a closed loop system would create a vacuum in the storage reservoir 30. In the preferred embodiment this is avoided by disposing a water bypass tube 712 between water store 60 and storage reservoir 30. A check valve 720 opens by the vacuum force as the electrolyte solution 20 is depleted from the storage reservoir 30, and the vacuum thus created draws water from the distilled water store 60 to the reservoir 30 to replenish the water consumed by the electrolysis process and lost to vaporization. Alternatively, a one-way valve (not shown) may be used to permit filtered air enter the reservoir 30 to maintain the atmospheric pressure inside the reservoir 30, similar to the one-way valve 800 used in the water store 60 to prevent vacuum build up inside the water store 60 when refilling the storage reservoir 30 through pump 410.

In both of these embodiments, an electronic control module (ECM) 375 monitors and processes inputs from sensors such as oxygen pressure sensor 325 and hydrogen pressure sensor 320, and all level and temperature sensors, and sends outputs to the various controllable valves and pumps. In the preferred embodiment the ECM 375 further sends messages to the vehicle operator and automatically shuts down the system in the event of a fault.

The system pressure is maintained by a pair of preset backpressure valves, oxygen valve 374 and hydrogen valve 373, while the differential pressure between oxygen and hydrogen is controlled by a preset pressure differential valve 372. As an alternate method of pressure control, these valves may be substituted by a more complex electronically controlled proportional valves or by other means.

Maintaining a pressure differential both prevents oxygen from seeping into the hydrogen flow path. In the case of the electrolysis cell described and illustrated in U.S. Patent Publication No. 20040040838, maintaining a differential pressure has the added benefit of reducing the risk of oxygen cross-flowing into the hydrogen path.

A significant portion of the harmful emissions produced by an automobile engine are discharged within the first few minutes after the engine is "cold-started." It would thus be very beneficial to be able to deliver hydrogen to the engine at the time that the engine is first started. However, the electrolyser cell 10 must be warm before electrolysis can take place. In order to provide an instant supply of hydrogen gas when the internal combustion engine is first started, in one preferred embodiment a hydrogen storage reservoir such as accumulator or buffer 327 may be provided upstream of flame arrestor 340, and downstream of a check valve 432. The accumulator 327 provides a store of hydrogen gas that is accumulated and maintained during a previous driving cycle, and is used to supply the engine upon start-up before the electrolysis cell 10 is fully operational by opening a hydrogen storage release valve such as hydrogen flow control valve 329. This provides some of the benefits of hydrogen injection immediately upon a cold start-up, and accelerates the engine and catalytic converter warm-up to reduce cold engine-related emissions. Once the electrolysis cell 10 is fully operational, the hydrogen gas store in the accumulator 327 is replenished so that the system can supply hydrogen gas the next time the engine and electrolysis system are started after being shutdown. For example, the ECM 375 may activate the gate two-way shutoff valve 330 upon start-up or at any time the vehicle system map calls for hydrogen. While the valve 329 controls the flow of hydrogen, the valve may remain in the open position and the line between 329 and 340 will remain pressurized regardless of the position of gate valve 330. This arrangement is particularly advantageous in system layout where the storage 327 is located farther away from the gate valve 330, so the hydrogen is available right at the gate valve when needed. The hydrogen generated by the electrolysis cell and delivered through hydrogen pressure regulator 373 and check valve 432 recharges the accumulator 327 while also supplying the engine through two-way shutoff valve 330. The maximum charge of hydrogen in the hydrogen accumulator 327 is determined by the pressure of hydrogen in the system, and upon system shutoff valve 330 is closed. Valve 329 regulates the flow of hydrogen from the accumulator 327 to the engine.

To facilitate the removal of electrolyte from the hydrogen output stream, the of the separation chamber 300 may be provided with a filter 299 that is permeable to hydrogen but impermeable to electrolyte droplets.

Pure hydrogen gas exits separation chamber 300 through hydrogen delivery line 400. The hydrogen delivery line 400 is in fluid communication with the hydrogen side of bilateral pressure sensor 372 which provides feedback to the ECM 375, which also controls hydrogen regulator valve 330. Likewise, the oxygen output line 405 is in fluid communication with the oxygen side of bilateral pressure sensor 372, also in communication with ECM 375. This allows the ECM 375 to monitor the hydrogen and oxygen system pressure controlled by preset backpressure valves 373 and 374, respectively, and differential pressure control valve 372 so as to maintain a constant differential pressure between hydrogen and oxygen, preferably in the range of 150-800 millibar, but in any event such that the pressure of hydrogen in the system is always higher than the pressure of oxygen.

When sufficient hydrogen is injected into the engine, the combustion flame is faster resulting in faster thermal expansion of combustion gases within the cylinder. Without adjustment of the spark delay, this can cause excessive cylinder pressure before the crank reaches top dead centre, which can cause parasitic losses and engine knocks. To compensate for this the ECM 375 may be programmed to control the spark delay in the engine cylinders, responsive to the amount of hydrogen being injected into the engine (as determined by the hydrogen pressure in the system).

Flame arrestor 340 stops flame propagation through the hydrogen delivery line 400 to prevent explosion of the hydrogen gas within the system. Hydrogen pressure relief valve 335 permits venting of the hydrogen line between flame arrestor 340 and hydrogen regulator valve 330 when hydrogen regulator valve 330 is closed.

Hydrogen gate shut-off valve 330 opens or closes to selectively regulate the flow of hydrogen to the intake manifold or hydrogen injector of the internal combustion engine, while backpressure control valves 373 and 374 maintains the desired system pressure. The valve 372 controls the difference in pressure between hydrogen and oxygen while the ECM 375 continuously monitors the pressure and shuts-off the current if a fault is detected. (The electrical connections between ECM 375 and the sensors from which it receives signals and pumps and valves which it controls are conventional, and for simplicity of illustration are not shown in FIG. 1.)

In the embodiment shown in FIG. 2 an oxygen moisture separation chamber 305, which may be similar to separation chamber 300 in the hydrogen flow path, is located in the oxygen output line 316 exiting storage reservoir 30, to remove electrolyte entrained in the oxygen gas. Preferably an oxygen permeable/electrolyte impermeable filter 315 removes entrained electrolyte from the oxygen before it exits storage reservoir 30.

In a first embodiment, the oxygen that passes through separation chamber 305 is vented to the atmosphere through oxygen backpressure pressure control valve 374. For safety reasons this should be at a convenient location away from any electrical or heat-producing component. In an alternate embodiment, the oxygen is supplied to both the differential pressure control valve 372 and an oxygen regulator valve (not shown) for injection into either the air intake of the engine, or directly into the engine cylinders, in a suitably controlled and safe fashion. The oxygen may be directed to any other desired use, with suitable safety precautions.

The ECM 375 is programmed to perform the functions described herein. It may be an ASIC, microprocessor or other suitably programmed control circuit. As will be evident to the skilled worker, although described as a separate control means for explanatory purposes, the control functions of the ECM 375 could also be implemented in a single multi-function controller such as the centralised automotive computer found in many automobiles, for example integrated into a Powertrain Control Unit (not shown). The ECM is not limited to any particular implementation.

If desired a pump can be used to circulate the electrolyte solution 20 between the electrolyte reservoirs 30, 32 and the electrolysis cell 10. In the preferred embodiment illustrated in FIG. 2 electrolyte solution 20 is circulated through the system in part through the use of the pressure of oxygen produced by the electrolysis cell 10, via oxygen diverter valve 240. Oxygen diverter valve 240 receives, via oxygen supply line 220, oxygen gas under pressure as a product of the electrolysis process. Oxygen diverter valve 240, by intermittently switching its valve position, alternates the flow of oxygen between the storage reservoir 30 and the supply reservoir 32. A clocked driver, contained for instance in ECM 375, actuates the oxygen diverter valve 240 at timed intervals to "active" and "quiescent" positions. In the quiescent position, the oxygen gas is delivered to the supply reservoir 32 through line 254, pressurizing the supply reservoir 32. With the valve 240 in this position the electrolyte from the electrolyte supply reservoir 32 is forced by the oxygen pressure out through electrolyte flow line 252, electrolyte valve 250 and the electrolyte supply line 110 to the electrolysis cell 10. In the active position, the oxygen valve 240 connects the lines 242 and 254 and diverts oxygen to the storage reservoir 30, in order to equalize the gas pressure between supply reservoir 32 and storage reservoir 30 and thus permitting the electrolyte 20 to drain by gravity from the storage reservoir 30 to the supply reservoir 32 through line 253. As previously indicated, if the storage reservoir 30 is not disposed above supply reservoir 32, a pump (not shown) may be provided to assist in draining the electrolyte from the storage reservoir 30 to the supply reservoir 32.

Electrolyte valve 250 operates co-operatively and in synchronization with the oxygen diverter valve 240, to connect electrolyte flow line 252 to electrolyte input line 110 in the quiescent state to permit electrolyte to flow from the supply reservoir 32 to the electrolysis cell 10. In the active state electrolyte valve 250 connects line 252 to the electrolyte transfer line 253 to permit electrolyte to flow from the storage reservoir 30 to the supply reservoir 32.

Supply reservoir 32 preferably includes a tamper-proof electrolyte drain valve 460. The drain valve 460 is used for draining of the electrolyte 20 in the event of servicing of the system.

The primary by-products of the hydrogen-producing electrolysis process in the electrolyzer 10 are oxygen gas and a slightly more concentrated electrolyte solution 20. The pressure inside the electrolyzer 10 is determined by the pressure setting of oxygen and hydrogen backpressure control valves 374 and 373, respectively. The electrolyte solution 20 is circulated through the electrolyzer 10 and out to the storage reservoir 30 through line 112 by the pressure of the oxygen gas applied inside the supply reservoir 32. To maintain the desired concentration in the electrolyte solution 20, from time to time, additional distilled water must be supplied from distilled water store 60 to storage reservoir 30, to rebalance the concentration of electrolyte solution 20. Distilled water store 60 may include a water level sensor 63 to alert the operator when the distilled water store 60 must be re-filled. Actuated by the refill level sensor 560 in the storage reservoir 30 and ECM 375, distilled water is pumped from the distilled water store 60 through water supply line 415 via water pump 410 into distilled water inlet tube 416, which delivers the distilled water to the storage reservoir 30. Between distilled water store 60 and storage reservoir 30 check valve 431 prevents any backflow between the storage reservoir 30 and the water store 60.

The ECM 375 is preferably programmed to automatically run the water replenishing cycle each time the engine is shut-off, regardless of the level of electrolyte solution 20 in the storage reservoir 30, unless the water store 60 is empty or the temperature sensor 62 indicates a temperature at or below the freezing point. Otherwise, the water replenishing cycle is run when initiated by a signal from the level sensor 560 to the ECM 375, which starts the pump 410. Whenever the engine is running, the system is heated and there is water 64 in the water store 60 in liquid state, the pump 410 can be started to replenish the consumed water in the electrolyte solution 20 inside the storage reservoir 30. However, the ECM 375 should be programmed not to initiate the water replenishing cycle if the water 64 in store 60 is at or below the freezing point and thus not suitable for pumping, since the ECM 375 would interpret this situation as a "fault" condition and shut the unit down due to a "low electrolyte level."

For example, if the engine is shut off when the system is at its normal operating temperature and the level of electrolyte 20 inside chamber 30 is close to (but not quite at) the level that would activate the level sensor 560, no signal will be sent from sensor 560. As the engine cools down, the electrolyte solution 20 in the storage reservoir 30 also cools down and its volume reduces is its temperature lowers. When the engine is started again, the ECM 375 and all sensors become active. The level of the electrolyte 20 in the storage reservoir 30, now reduced by the lower temperature to below the level sensor 560, immediately activates the level sensor 560, before the engine coolant has transferred enough heat to thaw the water 64 in the water store 60. Where the ambient temperature is at or below the freezing point, initiating the water replenishing cycle would cause a problem because the water 64 in store 60 may be at semi-solid or solid state that is not suitable for pumping. The ECM 375 would interpret this situation as a fault condition and shut the electrolysis system down due to a "low electrolyte level." Thus, in the preferred embodiment the ECM 375 is programmed not to initiate the water replenishing cycle when the level sensor 560 indicates a low electrolyte solution condition if the temperature sensor 62 indicates a temperature of water 64 in the water store 60 at or below the freezing point. In this situation the electrolysis system remains in active while the engine warms up, giving time for the engine coolant heating system to thaw the water 64 in the water store 60. The ECM 375 and sensors remain active, so that when the ECM 375 detects a reading above the freezing temperature from temperature sensor 62, the electrolysis system is activated and the water replenishing cycle begins responsive to the signal from the level sensor 560 indicating low electrolyte solution 20 in the storage reservoir 30.

The invention provides a system for draining distilled water from the water conduits in the electrolyte delivery system. If water remains in the supply line 417 it will freeze at temperatures below 0 degrees Celsius, which at best will cause a system error and at worst will cause the supply line 417 to crack or split. Thus, to prevent distilled water from freezing in the supply lines, upon deactivation ECM 375 opens purge valve 600 for a preset interval, to allow distilled water in the supply line 417 to drain through drain line 417a under the influence of gravity. Preferably the water supply line 417 is disposed at a level above a level of the water 64 in the water store 60, so that the portion of water supply line 417 between the pump 410 and the water store 60 drains back into the water store by gravity upon shutdown, and only the portion of water supply line 417 downstream of the pump 410 needs to be drained through line 417a. This aspect of the invention can also be used in the case where the electrolyte solution is water, which may for example supply electrolyte directly to the electrolysis cell 10.

In the preferred embodiment, responsive to deactivation of the engine the ECM 375 runs the water replenishing cycle (regardless of the level of electrolyte solution in the storage reservoir 30). When the water replenishing cycle is complete, the ECM 375 opens purge valve 600 as described above to drain the water from the water supply line 417.

As a safety precaution, optionally a fault level sensor (not shown) may be positioned below the low level sensor 63, so that if the level of electrolyte solution 20 in the storage reservoir 30 reaches the fault level sensor this indicates a fault condition (i.e. insufficient water in the water store 60), and the ECM 375 either shuts down the system or prevents activation of the system upon start-up until the distilled water store 60 is filled.

Two electrolyte solution level sensors 520, 560 are provided in the storage reservoir 30, as shown in FIG. 1. When the level of electrolyte solution 20 in storage reservoir 30 falls to the level of refill level sensor 560, ECM 375 actuates the water pump 410 to add distilled water to the storage reservoir 30. Distilled water is added until the solution is detected at high level sensor 520, at which point the ECM 375 stops the pump 410. Optionally a fault level sensor (not shown) may be positioned below the low level sensor 560, so that if the level of electrolyte solution 20 in the storage reservoir 30 reaches the fault level sensor this indicates a fault condition: for example, the water in the distilled water store 60 is frozen, the distilled water pump 410 is not working properly, there is a leak in the electrolyte solution circulation system, or the system otherwise requires maintenance before the system can resume operation; so as a safety feature, in this instance the ECM 375 shuts down the entire system. One-way valve 800 may be used in the water store 60 to prevent vacuum build up inside the water store 60 when refilling the storage reservoir 30 through pump 410.

In one embodiment, a coolant circulating system may be provided for pre-heating either or both of the distilled water and/or the electrolyte solution 20 in the storage reservoir 30, using heat from the engine coolant. Pre-heating of the distilled water and/or the electrolyte solution assists in accelerating and regulating the rate of electrolysis when the system is cold. The desirability of pre-heating the water is dependent upon a number of factors that affect whether the temperature of the electrolyte solution 20 in storage reservoir 30 may be maintained at a target temperature. These factors include the size of storage reservoir 30, the relative volumetric flow of water into storage reservoir 30 under normal operating conditions, to how remote water store 60 is stored relative to the storage reservoir 30, and the heat transfer rate from the engine coolant to the electrolyte solution 20.

Distilled water store 60 is a water-impermeable container with a water outlet in communication with a water line 415 that leads to the water pump 410. In the preferred embodiment, the water store 60 may be heated by hot engine coolant fed into the container 60 by a suitable conduit such as tubing 61 (for example plastic). In a typical automotive application, coolant is pumped through a coolant circuit to maintain the internal combustion engine at an optimum operating temperature. The coolant is pumped by a water pump, typically an impeller pump, through channels in the engine block. Heat is transferred from the engine block to the coolant, which flows out of the engine block through hoses to a radiator. The coolant is cooled in the radiator, typically a cross-flow heat exchanger, by the flow of air which is typically assisted by means of an external fan. An expansion element-type thermostat controls the valve that closes the engine coolant flow to the radiator and simultaneously opens the bypass connection to circulate the coolant through the engine only until the engine reaches desired operating temperature. Another type of thermostat used for this purpose is an electronic unit controlled by map program, with the ability to progressively control the coolant flow through the radiator for improved efficiency. Typically, on start-up on cold days, the fan and possibly the pump are not initially activated to allow the engine to reach operating temperature as quickly as possible. Running the engine at operating temperature is desirable as tolerances and engine fluids are selected to provide peak performance at that temperature. At lower temperatures engines will typically operate with lower efficiency, and increased emissions.

In the embodiment shown coolant tubing runs into and out of water store 60 through openings in the top of water store 60. Engine coolant from the engine cooling system 80 can be selectively diverted by coolant diversion valve 90 through the tubing 61 in order to transfer heat absorbed by the coolant from the engine to the contents of distilled water store 60, and thus thaw or warm the distilled water. As shown in FIG. 1, tubing 61 connects to engine cooling system 80 to form a circuit. It will be appreciated that the loop of tubing 61 could be positioned many different ways within, or wrapped around, the container 60, to achieve the desired heat transfer. The loop of tubing 61 may alternatively feed the hot coolant to a conduit integrated into the water store container 60, such as an internal channel or double wall. A temperature sensor 62 allows ECM 375 to monitor the temperature of the water in distilled water store 60 and to control coolant valve 90 to maintain the water at a target temperature. When the temperature sensor 62 indicates that the temperature of the distilled water is below 0 degrees Celsius, or below a preset temperature above 0 degrees Celsius, coolant valve 90 is energized to its active condition to divert the flow of engine coolant from the engine cooling system 80 through the tube 61 to heat the distilled water in water store 60. Once temperature sensor 62 indicates the distilled water is above the freezing point or at the preset temperature, coolant valve 90 returns to the quiescent position to cease the diversion of hot coolant through the tube 61. Check valve 433 prevents backflow into the upper electrolyte reservoir heating circuit, described below.

In an alternative embodiment, distilled water store 60 comprises a container with a liquid-impermeable channel in its sidewalls through which engine coolant received from engine cooling system 80 may flow (not shown), in order to transfer heat to distilled water store 60 and ultimately to the distilled water therein so that it may be thawed if it is frozen.

Waste heat from the engine may also be used to heat electrolyte solution 20 in storage reservoir 30, for example to a temperature around 90° C. which is ideal for the operation of electrolysis cell 10. The electrical resistance of the electrolyte is considerably lower at this temperature than it is at normal atmospheric temperatures, so as a result the electrolyzer 10 has a significantly lower resistance to the electrolysing current and can produce the required hydrogen gas at a lower operating voltage.

When the temperature of the distilled water is above 0 degrees Celsius, when the coolant gate shutoff valve 97 is open, the coolant diversion valve 90 in its quiescent condition (shown in solid lines) diverts engine coolant solely through the storage reservoir 30 via a coolant conduit comprising tubing loop 92, which includes a loop of tubing located inside storage reservoir 30 to circulate the flow of coolant in thermal contact with the electrolyte solution 20. This heats the electrolyte solution 20 in the storage reservoir 30 to a desired temperature, for example around 90 degrees Celsius. Alternatively, a portion of the conduit conveying heated liquid coolant may be integrated into the storage reservoir 30 via a double wall or liquid impermeable channels (not shown) provided in the side walls of storage reservoir 30 through which to circulate the engine coolant supplied by tubing loop 92. In either embodiment, the tubing or channel is liquid-impermeable so that no engine coolant contaminates electrolyte solution 20, and only the heat from the engine coolant is transferred into the electrolyte solution 20. ECM 375 may optionally employ an additional temperature sensor in storage reservoir 30 to divert coolant if the temperature in the storage reservoir exceeds the target temperature by closing coolant shut-off valve 97. Check valve 434 prevents backflow into the water store heating circuit described above.

In the preferred embodiment, the engine coolant is a conventional engine coolant comprising a base-fluid comprising approximately 95% or more of the coolant and additionally any of corrosion inhibitors, antifoams, dyes and other additives. The base-fluid is typically comprised of a 50/50 mix of ethylene glycol and water. The primary function of engine cooling system 80 is to transfer heat away from the engine. Thus, the engine coolant receives waste heat from the engine during operation and flows away from the engine to dissipate the heat. As long as the engine continues to run and the distilled water is frozen, heat will be transferred from the engine to distilled water store 60 via the engine coolant to increase the temperature inside distilled water store 60 to above 0 degrees Celsius.

The amount of coolant diverted from engine cooling system 80 is dependent upon the operational characteristics of the particular internal combustion engine. A small engine produces less heat and consequently has a small volume of coolant flow. The entire volume of coolant flow may be required to heat the electrolyte solution 20 and thaw the distilled water in water store 60. A large engine generally requires a much larger volume of coolant flow to manage its temperature. This volume of coolant flow may be considerably more than is required to heat the electrolyte solution 20 and thaw the distilled water in water store 60. In such circumstances it may be preferable to divert only a portion of the coolant flow to heat electrolyte solution 20 and thaw the distilled water, while the remainder of the coolant flows directly through engine cooling system 80.

Coolant gate shutoff valve 97 is used to prevent the coolant from flowing through the distilled water heating circuit 61 or electrolyte heating circuit 92 in cases where the coolant not needed to further heat up either the electrolyte solution 20 or thaw the distilled water in water store 60. Since coolant is necessary for the engine to operate, whereas use of the coolant to heat the electrolyte and thaw distilled water is merely advantageous, it is preferable to preserve the coolant flow through the engine in the event of a blockage or leak, or extreme temperatures, to ensure continued safe operation of the engine. Control of the diversion valve may either be accomplished via ECM 375, or through the central engine computer.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A system for circulating an electrolyte solution between a reservoir and an electrolysis cell, the system comprising:
a water store in communication with a water supply line, for replenishing a level of electrolyte solution used by the electrolysis cell, and
a valve in fluid communication with the supply line, when the valve is opened any water contained in the water supply line drains out of the water supply line instead of replenishing the level of electrolyte solution.

2. The system of claim 1 in a motor vehicle having a combustion engine, comprising a controller for opening the valve in response to deactivation of the engine.

3. The system of claim 2 wherein the controller opens the valve for a preset interval.

4. The system of claim 2, further comprising a storage reservoir for storing the electrolyte solution for circulation to the electrolysis cell, the water store being in fluid communication with the storage reservoir through the water supply line.

5. The system of claim 4, further comprising a pump for pumping the water to the storage reservoir.

6. The system of claim 5 wherein the pump is disposed in the supply line.

7. The system of claim 5 wherein the valve is disposed at a level below a level of the water supply line.

8. The system of claim 5 wherein the water supply line is disposed at a level above a level of the water in the water store.

9. The system of claim 5 wherein in response to deactivation of the engine the controller is programmed to run a water replenishing cycle to replenish a level of electrolyte solution from water in the water store, prior to opening the valve.

10. A method of preventing freezing of a water supply line for replenishing a level of electrolyte solution used by an electrolysis cell in a motor vehicle having a combustion engine, comprising the steps of:
   a. sensing deactivation of the engine, and
   b. subsequent to deactivation of the engine, opening a valve in fluid communication with the supply line,
whereby when the valve is opened water drains out of the water supply line instead of replenishing the level of electrolyte solution.

11. The method of claim 10, comprising a controller for sensing deactivation of the engine and opening the valve.

12. The method of claim 11, wherein in step b. the controller opens the valve for a preset interval.

13. The method of claim 10 further comprising, before step b., the step of running a water replenishing cycle to replenish the level of electrolyte solution.

14. The method of claim 13 wherein the step of running a water replenishing cycle is performed responsive to deactivation of the engine.

15. The method of claim 13 wherein the electrolyte solution is stored in a storage reservoir in fluid communication with a water store through the water supply line, wherein the step of running a water replenishing cycle to replenish the level of electrolyte solution comprises the step of activating a pump in fluid communication with the water supply line for pumping the water to the storage reservoir.

16. A system for circulating an electrolyte solution between a reservoir and an electrolysis cell, the system comprising:
   a water store in communication with a water supply line, for replenishing a level of electrolyte solution used by the electrolysis cell, and
   a valve in fluid communication with the supply line,
whereby when the valve is opened the water drains out of the water supply line,
   wherein said system for use in a motor vehicle having a combustion engine, comprises a controller for opening the valve in response to deactivation of the engine,
   wherein said system further comprises a storage reservoir for storing the electrolyte solution for circulation to the electrolysis cell, the water store being in fluid communication with the storage reservoir through the water supply line,
   wherein said system further comprises a pump for pumping the water to the storage reservoir, and
   wherein, in response to deactivation of the engine, the controller is programmed to run a water replenishing cycle to replenish a level of electrolyte solution from water in the water store, prior to opening the valve.

17. A method of preventing freezing of a water supply line for replenishing a level of electrolyte solution used by an electrolysis cell in a motor vehicle having a combustion engine, comprising the steps of:
   a. sensing deactivation of the engine, and
   b. subsequent to deactivation of the engine, opening a valve in fluid communication with the supply line,
whereby when the valve is opened water drains out of the water supply line,
   wherein said method further comprises, before step b., the step of running a water replenishing cycle to replenish the level of electrolyte solution.

18. The method of claim 17 wherein the step of running a water replenishing cycle is performed responsive to deactivation of the engine.

19. The method of claim 17 wherein the electrolyte solution is stored in a storage reservoir in fluid communication with a water store through the water supply line, wherein the step of running a water replenishing cycle to replenish the level of electrolyte solution comprises the step of activating a pump in fluid communication with the water supply line for pumping the water to the storage reservoir.

* * * * *